J. SEEMANN.
TRANSMISSION MECHANISM.
APPLICATION FILED OCT. 19, 1917.

1,267,001. Patented May 21, 1918.

WITNESSES
James F. Crown,
N. H. Babcock,

INVENTOR
John Seemann,
By Richard B. Owen,
ATTORNEY

UNITED STATES PATENT OFFICE.

JOHN SEEMANN, OF GLADBROOK, IOWA.

TRANSMISSION MECHANISM.

1,267,001.  Specification of Letters Patent.  Patented May 21, 1918.

Application filed October 19, 1917. Serial No. 197,472.

*To all whom it may concern:*

Be it known that I, JOHN SEEMANN, a citizen of the United States, residing at Gladbrook, in the county of Tama and State of Iowa, have invented certain new and useful Improvements in Transmission Mechanisms, of which the following is a specification.

This invention relates to transmissions, and more particularly to a transmission so constructed as to maintain the transmission shaft at a constant speed of rotation.

One of the main objects of the invention is to provide a transmission of simple construction and operation in which the transmission shaft is maintained at constant speed of rotation so as to be well adapted for operating electrical generators, and similar machines. A further object is to provide a transmission which can be used with a variable source of power, simple and efficient means being provided for inversely varying the driving connections between the source of power and the transmission shaft so as to maintain the latter at constant speed. Another object is to provide a rotatable drive disk associated with a transmission shaft, a friction drive wheel being feathered on the shaft so as to be movable across the face of the disk, means being provided for automatically moving the drive wheel toward the center of the disk, or away from the center of the disk, in accordance with variations in the speed of rotation of said disk so as to maintain the transmission shaft at a constant speed of rotation. Another object is to provide a transmission in which the drive disk is held resiliently in contact with the friction wheel so as to permit movement of the wheel across the face of the disk while insuring proper driving contact between these two members. Further objects will appear from the detail description.

In the drawings:—

Figure 1:
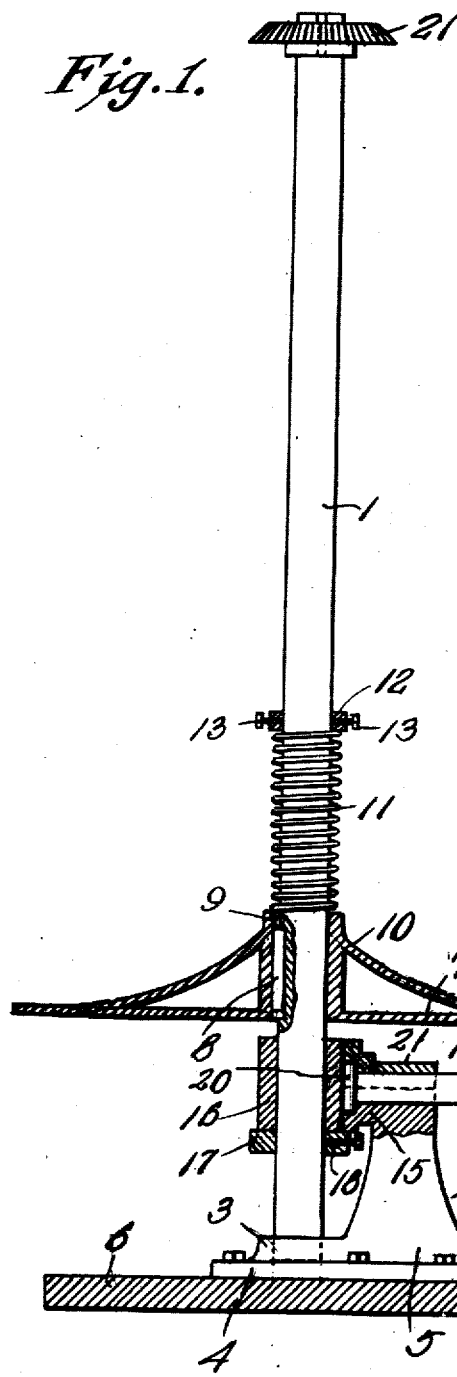
Figure 1 is a central vertical section through a transmission mechanism constructed in accordance with my invention.
Figure 2:
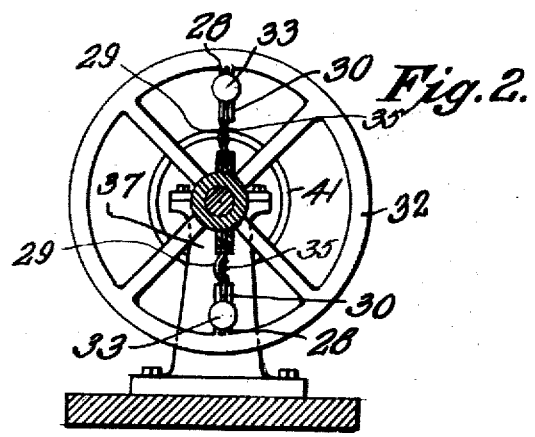
Fig. 2 is a section taken on line 2—2 of Fig. 1.
Figure 3:
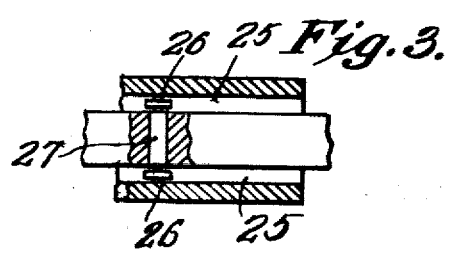
Fig. 3 is a fragmentary detail of the mounting of the friction drive wheel.

This mechanism is especially adapted for use in connection with wind mills and other suitable sources of power in which there is considerable variation in the power available for driving the mechanism. The vertical drive shaft 1 is provided at its upper end with a bevel gear 2 keyed thereon so as to establish drive connections between the wheel of the wind mill and the shaft. The lower end of shaft 1 is seated in a bearing cup 3 formed integral with the base 4 of a supporting bracket 5 which is secured on a platform 6 or other suitable supporting structure. A drive disk 7 is slidably mounted on shaft 1 near the lower end thereof and is connected to the shaft so as to rotate therewith by means of a key 8 secured in the shaft and projecting into the groove 9 formed in the inner face of the hub 10 of the disk. This disk is forced downward by an expansion spring 11 mounted about the shaft and confined between the hub 10 of the disk and a collar 12 secured to the vertical adjustment on the shaft by set screws 13. By means of the collar the downward pressure exerted on the disk may be varied to suit circumstances. The downward movement of disk 7 is positively limited by a friction drive pulley or wheel 14 which engages the under or drive face of the disk. By this construction, the disk will be rotated with shaft 1 and will impart rotation to the friction drive wheel 14.

Bracket 5 is provided, at its upper end, with a horizontal arm 15 at the inner end of which is formed an integral bearing sleeve 16 through which passes the shaft 1, this sleeve acting as a bearing and bracing member for the shaft. A collar 17 is secured on the shaft closely adjacent the lower end of the same, by means of a set screw 18, and serves to effectually prevent upward movement of the shaft. The arm 15 is shaped to receive the end portion of a horizontal transmission shaft 19. This shaft is provided, at its inner end, with an enlarged disk-like head 20 which fits into a semi-cylindrical recess in sleeve 16. A bearing plate 21 is secured over the upper end of arm 15 in the usual manner, and coöperates with the arm and the sleeve 16 to provide a securing and bearing member for the inner end portion of shaft 19. The friction wheel 14 may be of any suitable construction, that shown being composed of a plurality of rings of suitable material, such as paper, rubber, and canvas which are held pressed tightly together by the end plates 22 and securing bolts 23. This friction wheel is secured on the inner end of a sleeve 24 which is slidable longitudinally of shaft 19. This sleeve is provided, in its inner face, with diametrically opposite and longitudinally extending grooves 25 which receive anti-friction rollers 26 mounted on a pin 27 which is secured through the shaft. This sleeve is provided, at its outer end, with diametrically opposite pairs of ears 28. These ears receive between them the inner ends of links 29 which are pivotally secured thereto. The outer ends of these links are pivotally secured to the forked outer ends of control levers 30 pivotally mounted intermediate their ends between the diametrically opposite pairs of ears 31 carried by a fly wheel 32 secured on the shaft 19. Each of the levers 30 is provided at its inner end with an integral weight-ball 33. An eye-bolt 34 is adjustably secured to each of the levers 30 intermediate the ball 33 and the pivot point of the lever. A coil tension spring 35 is passed through a diametrical bore 36 through shaft 19 and has its ends secured through the eyes of bolts 34. This spring acts to normally force the inner ends of the levers 30 toward each other so as to move the friction drive wheel 14 outward longitudinally of shaft 19 and away from the center of drive disk 7.

A standard 37 is secured to the supporting platform 6 adjacent the outer end of the transmission shaft. This standard is recessed in its upper ends to receive the shaft, in the usual manner, a cap plate 38 being secured on the standard about the upper portion of the shaft. The shaft is provided with annular grooves 39 for receiving bearing balls 40, these balls act to take the end thrust of the shaft and coöperate with the arm 15 and sleeve 16 of standard 5, and the head 20 at the inner end of the shaft, to effectually prevent longitudinal movement of the transmission shaft. A pulley wheel 41 is secured on the transmission shaft adjacent the outer end thereof and provides means for operatively connecting the shaft to an electrical generator or other suitable machine which it is desired to drive at a constant speed.

In using this transmission in connection with wind mills or any other suitable source of power with which there will be considerable variation in the speed of rotation of the drive shaft 1, the transmission shaft will be maintained at a constant speed of rotation. If the speed of rotation of the disk 7 is increased, this will result in throwing the weights 33 at the inner ends of arms 30 outward by centrifugal force so as to move the friction drive wheel 14 toward the center of the disk this automatically preventing increase in the speed of rotation of the transmission shaft. If the speed of rotation of disk 7 decreases, the reverse action will take place so as to prevent decrease in the speed of rotation of shaft 19. By this arrangement, the shaft 19 will be maintained at a constant speed of rotation and, for this reason, this mechanism is well adapted for transmitting power from a variable source to an electrical generator or other machine which it is essential to maintain at a practically constant speed of rotation.

It will be obvious that there may be slight variations made in the construction and arrangement of the different parts of my invention without departing from the field and scope of the same, and I intend to include all such variations, as fall within the scope of the appended claims, in this application in which a preferred form only of my invention is disclosed.

What I claim is:

1. In transmission means, a drive disk, a transmission shaft, a friction drive wheel feathered on said shaft and movable across the face of the disk, a fly-wheel secured on the transmission shaft, control levers pivoted intermediate their ends on the fly-wheel, and connections between said levers and drive wheel for moving the drive wheel toward the center of the disk in accordance with any increase in the speed of rotation of the same and away from the center of the disk in accordance with any decrease in the speed of rotation thereof so as to maintain the transmission shaft at a constant speed of rotation.

2. In transmission means, a drive disk, a transmission shaft, a sleeve feathered on said shaft, a friction wheel carried by the sleeve and movable across the face of the disk, a fly-wheel secured on the shaft beyond said disk, diametrically opposite control levers pivotally mounted intermediate their ends on the fly-wheel, links connected to the outer ends of said levers and the outer end of said sleeve, and resilient means for normally forcing the inner ends of said control levers toward each other, said means being adjustable whereby the transmission shaft may be maintained at any desired constant speed of rotation.

In testimony whereof I affix my signature in presence of two witnesses.

JOHN SEEMANN.

Witnesses:
 ALICE WHITTAKER,
 R. O. WEMENTIN.

Copies of this patent may be obtained for five cents each, by addressing the "Commissioner of Patents, Washington, D. C."